(12) United States Patent
Soraghan et al.

(10) Patent No.: US 6,453,206 B1
(45) Date of Patent: Sep. 17, 2002

(54) NEURAL NETWORK FOR PREDICTING VALUES IN NON-LINEAR FUNCTIONAL MAPPINGS

(75) Inventors: John James Soraghan; Amir Hussain, both of Glasgow (GB)

(73) Assignee: University of Strathclyde, Glasgow (GB)

( * ) Notice: Subject to any disclaimer, the term of this patent is extended or adjusted under 35 U.S.C. 154(b) by 0 days.

(21) Appl. No.: 09/308,559

(22) PCT Filed: Nov. 21, 1997

(86) PCT No.: PCT/GB97/03138

§ 371 (c)(1),
(2), (4) Date: Aug. 10, 1999

(87) PCT Pub. No.: WO98/22884

PCT Pub. Date: May 28, 1998

(30) Foreign Application Priority Data

Nov. 22, 1996 (GB) ............................................. 9624298

(51) Int. Cl.$^7$ ............................................. G05B 13/02
(52) U.S. Cl. ............................ 700/48; 700/44; 700/47; 700/49; 700/50; 706/2; 706/8; 706/15; 706/32; 706/44; 382/158; 382/159; 382/160
(58) Field of Search .............................. 700/44, 47, 48, 700/49, 50, 29, 30, 32, 46; 382/158–160; 706/14–20, 43, 44, 37–39, 23, 25, 903, 906, 2, 8–9, 30–32

(56) References Cited

U.S. PATENT DOCUMENTS

| | | | |
|---|---|---|---|
| 5,113,483 A | * | 5/1992 | Keeler et al. .................... 706/25 |
| 5,335,291 A | * | 8/1994 | Kramer et al. .................. 382/158 |
| 5,408,424 A | * | 4/1995 | Lo .................................. 708/303 |
| 5,606,646 A | * | 2/1997 | Khan et al. ..................... 382/158 |
| 5,704,011 A | * | 12/1997 | Hansen et al. .................. 700/44 |
| 5,719,480 A | * | 2/1998 | Bock et al. ..................... 318/561 |
| 5,751,913 A | * | 5/1998 | Chiueh et al. ................... 706/41 |
| 5,761,383 A | * | 6/1998 | Engel et al. ..................... 706/14 |
| 5,790,758 A | * | 8/1998 | Streit .............................. 706/33 |
| 5,796,924 A | * | 8/1998 | Errico et al. .................... 706/25 |

OTHER PUBLICATIONS

Gan W S et al; "New Functional–Link Based Equaliser", Electronic Letters, vol. 28, No. 17, Aug. 13, 1992, pp. 1643–1645, XP000315888.

Gan W S et al; "Functional–Link Models for Adaptive Channel Equaliser", Proceedings Of The International Conference On Acoustics, Speech, Signal Processing (ICASSP), Digital Signal Processing, Adelaide, vol. 3, Apr. 19, 1994, pp. III–309–III–312.

Hussain A et al; "A New Artificial Neural Network Based Adaptive Non–linear Equalizer for Overcoming Co–Channel Interference", London, UK, Nov. 18–22, 1996, pp. 1422–1426, vol. 2.

Hussain A et al; "New Non–Linear Decision Feedback Equalizers Based on the Functional–Link Neural Network", IEE Colloquium On 'Non–Linear Filters' (Digest No. 1994/125), London, UK, pp. 8/1–6.

Von V Chalupa; "Training smethoden beim Einsatz eines Zeitvektorenklassifikators", Regelungstechnik Und Prozess––Datenverabeitung, vol. 18, No. 11, Nov. 1970, pp. 500–503.

* cited by examiner

*Primary Examiner*—Ramesh Patel
(74) *Attorney, Agent, or Firm*—Alston & Bird LLP

(57) ABSTRACT

A neural network for predicting values in non-linear functional mappings having a single hidden layer function generator (12) and an output layer (40). The single hidden layer function generator (12) is operable to receive one or more mapping inputs (x1) and generate a plurality of terms (14) from each mapping input. The plurality of terms generated by the single hidden layer function generator (12) includes at least one trigonometric term selected from the group comprising sin(x1), sin(2x1), sin(3x1), cos(x1), cos(2xl), cos(3xl), cosec(xl), cotan(xl), and being free of Gaussian and Sigmoidal terms.

5 Claims, 5 Drawing Sheets

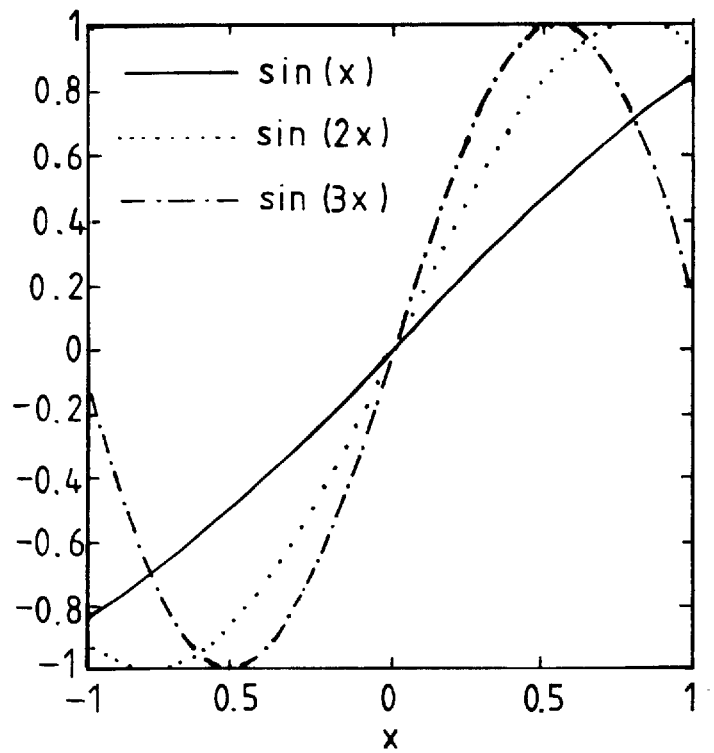
F I G. 7a
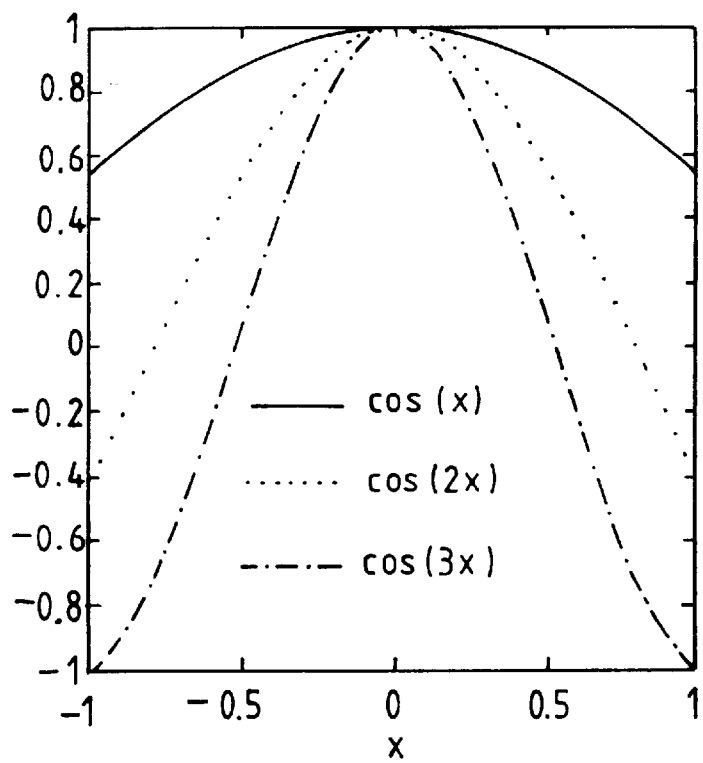
F I G. 7b

NEURAL NETWORK FOR PREDICTING VALUES IN NON-LINEAR FUNCTIONAL MAPPINGS

The present invention relates to the field of artificial neural networks, in particular it relates to a single hidden layer artificial neural network for predicting values in non-linear functional mappings.

Predicting future values of a process based on the previous known values of the process is frequently attempted using artificial neural networks. The neural network does this by modelling the short-term structure of the process.

It is usually a trivial problem to predict the next few values in a linear functional mapping; however, it is much more difficult to predict the next few values in a non-linear functional mapping.

The short term structure of a non-linear functional-mapping can be modelled by expressing the present value of the mapping sample as a function (prediction function) of the previous values of the mapping. Once the correct value of a predicted value becomes known, it is compared with the predicted value to produce an error. The error is a measure of the accuracy of the prediction function at predicting the correct value. To optimise the prediction function, the error is used to modify the prediction function. Thus, the prediction function is constantly being changed to match the short-term structure of the mapping.

One example of a prediction function is a polynomial. Polynomials can be used to approximate any non-linear continuous function to an arbitrary degree of accuracy, even if the non-linear continuous function is a so-called chaotic series.

In a non-linear chaotic functional mapping the uncertainty of the prediction increases exponentially as the value to be predicted is moved farther from the last known value. This precludes any long-term predictability. However, short term predictability is still possible based on the short-term structure of the mapping.

Previous attempts to predict the next few values in a non-linear mapping have used feed-forward neural network predictors with an input comprising a function of the previous values of the mapping and a single output. Two main types of feed-forward neural network have been used. The first type is a Multi Layer Perceptron (MLP) neural network, the second is a Radial Basis Function (RBF) neural network.

The primary difference between these two structures is that the MLP structure uses at least two hidden layers; whereas the RBF structure only uses one hidden layer. The nature of the basis or activation functions (the functions which operate on each of the inputs) of these two neural networks is also different. The MLP neural network uses Sigmoidal basis functions (which are non-zero over an infinitely large input space) as shown in FIG. 1*a* whereas the RBF uses Gaussian basis functions (which are localized to certain areas of input space) as shown in FIG. 1*b*. Experience has shown that some non-linear problems can be solved more efficiently using Sigmoidal basis functions, whereas others can be solved more efficiently using Gaussian basis functions.

An RBF network has several advantages and disadvantages compared with an MLP. An RBF network has a linear-in-the-parameters structure which means that it can use standard linear regression techniques to optimise the structure. Linear regression techniques have the relative advantages of ease of analysis and rapid learning characteristics compared with non-linear regression techniques. Non-linear regression techniques are used for non-linear-in-the-parameters structures, such as the MLP structure. Non-linear regression techniques (such as back propagation) are computationally expensive, very slow and can converge to local minimum solutions rather than the global minimum solution.

However, an RBF network has the disadvantage of requiring a prohibitively large number of Gaussian basis functions to cover high dimensional input spaces (a large number of inputs). An RBF network also needs a pre-learning stage to be performed so that the appropriate Gaussian functions (families of Gaussian functions with varying centres and widths) can be selected for a particular application.

Thus, a further disadvantage of the RBF network is that it must be tailored to each individual application; whereas the MLP network is suitable for a number of different applications because its learning strategy is more complex.

It is an object of the present invention to obviate or mitigate at least one of the above disadvantages associated with single hidden layer neural networks such as an RBF network.

This is achieved by using a single hidden layer neural network which generates trigonometric activation functions (rather than Gaussian or Sigmoidal activation functions) and linear activation functions of the inputs, and then weights the resultant activation functions produced using standard linear regression techniques.

One advantage of this invention is that it combines the accurate prediction associated with a non-linear basis function with a structure suitable for use with fast, conventional, linear regression techniques. It has some of the advantages associated with RBF networks (speed of response, simplicity) and also some of the advantages associated with the MLP network (adaptability to a number of different applications, no need for an advanced pre-learning stage, suitably for use with multiple inputs).

The present invention also has the advantage of improved non-linear predicting ability by using trigonometric activation functions which have the effect of simulating both Sigmoidal-shaped and Gaussian-shaped functions simultaneously. The conventional linear regression technique automatically adjusts the weightings for each activation function to produce the most appropriate function for modelling the particular functional mapping.

According to a first aspect of the present invention there is provided a neural network of the radial basis function type having a single hidden layer function generator and an output layer, wherein the function generator receives one or more mapping inputs and generates a plurality of terms from each mapping input, said terms including at least one trigonometric term and being free of Gaussian and Sigmoidal terms.

It will therefore be understood that the neural network comprises: at least one mapping input representing a value of a mapping; a control input representing a value to be predicted in the mapping; a single hidden layer function generator for receiving each mapping input and for generating a plurality of terms from each mapping input, including at least one trigonometric term; an adaptive weight block comprising a plurality of weight elements and a weight controller, where each weight element receives an associated term and multiplies the said associated term by a value received from the weight controller to produce an individually weighted term; an adding block for receiving each individually weighted term and for adding the individually weighted terms to produce a summed term; a comparator for receiving the summed term and the control input and for comparing the summed term with the control input to generate a difference value; an analyser for receiving the difference value, for determining the new value of each individual weight element needed to minimise the difference value, and for conveying the said new value of each individual weight to the weight controller, where the weight controller adjusts the individual weight elements accordingly; and a data output representing the predicted term of the mapping which is connected to the output of the adding block, which is the summed term.

Preferably, the function generator generates at least two trigonometric terms, one a sine term the other a cosine term.

Preferably, where more than one input is used, the hidden layer function generator includes terms resulting from the product of two or more of the inputs.

Preferably, the function generator selects at least one term from the group of terms consisting of: a zero order term, the original mapping inputs, sine functions of the mapping inputs, cosine functions of the mapping inputs, functions equalling the product of a mapping input and a sine function of-another mapping input, functions equalling the product of a mapping input and a cosine function of another mapping input, functions equalling the product of a mapping input and a different mapping input.

According to a second aspect of the present invention there is provided a method of predicting a value in a mapping using a single hidden layer neural network comprising the steps of: receiving at least one mapping input corresponding to a value in a mapping, receiving a control input corresponding to a value to be predicted in the mapping, generating at least one trigonometric term for each mapping input, weighting each term generated by an adaptable weight, summing the weighted terms to produce a sum, comparing the sum with the control input to produce a difference, analysing the difference to determine the optimum value of each adaptable weight to minimise the difference, adjusting the adaptable weight applied to each term in response to the analysis, iteratively repeating a predetermined number of times the above five steps of weighting, summing, comparing, analysing, and adjusting, where for the second and subsequent time the control input is the correct value corresponding to the predicted value of the previous iteration; and presenting the sum to an output.

Preferably, any terms which have negligible effect on minimising the difference value are pruned.

These and other aspects of the present invention will become apparent from the following description when taken in combination with the accompanying drawings, in which:

FIG. 7a is a graph of the functions produced by y=cosine(x), y=cosine(2x), and y=cosine(3x), where x is the normalised input and y is the value displayed on the y-axis;

FIG. 7b is a graph of the functions produced by y=sine(x), y=sine(2x), and y=sine(3x), where x is the normalised input and y is the value displayed on the y-axis;

Figure 1A:
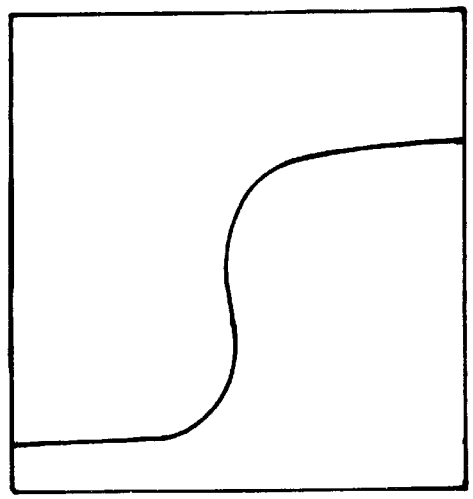
FIG. 1a is an example of a Sigmoidal-shaped function.
Figure 1B:
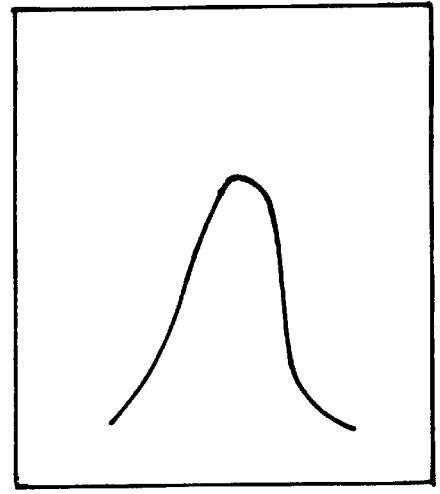
FIG. 1b is an example of a Gaussian-shaped function.
Figure 2:
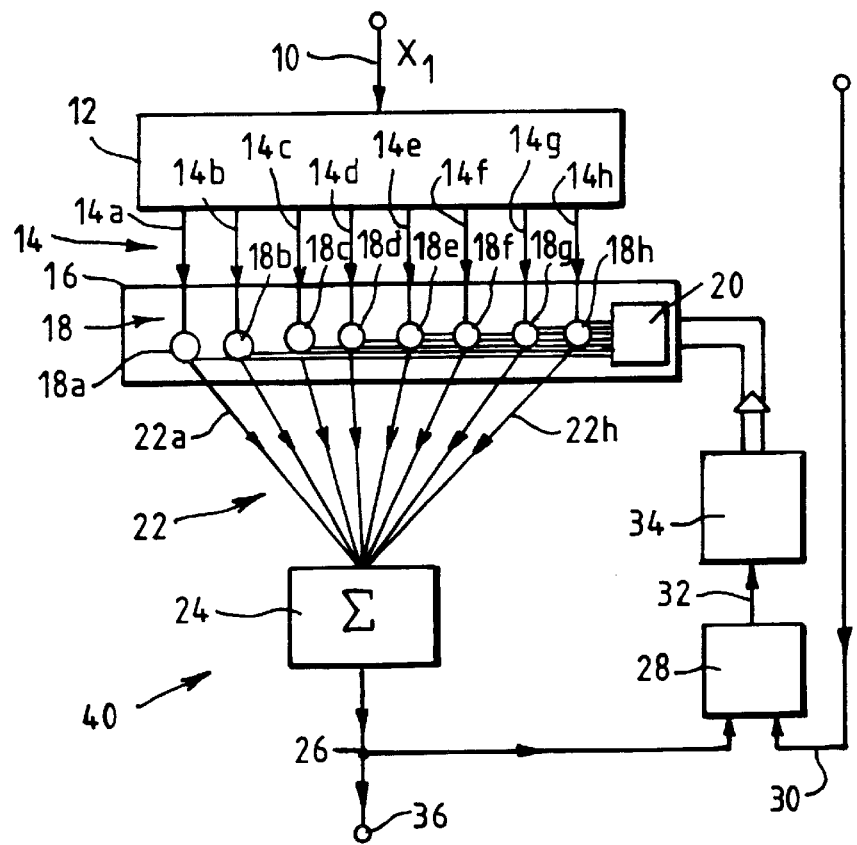
FIG. 2 shows a diagram of a first embodiment of the present invention in a neural network, with one input and one output.

Referring to FIG. 2, which shows a diagram of a first embodiment of the present invention in a neural network, there is an input 10 which is used for receiving one value labelled x1 of a mapping function. The input value is normalized so that its value is within the range from minus one to plus one. The input 10 is connected to a single hidden layer function generator 12. The function generator 12 operates on the value x1 at the input 10 to generate eight functional terms 14, that is, the function generator 12 functionally expands the mapping input to produce eight functional terms. It is understood in this field that each of the terms 14 is a mathematical function of the value x1 at the input 10.

The functional terms produced are: a zero-order (constant) value 14a; the original input x1 denoted 14b which enables linear systems to be modelled; three sine expansions of the input sin(x1) denoted 14c, sin(2x1) denoted 14d, and sin(3x1) denoted 14e; and three cosine expansions of the input, cos(x1) denoted 14f, cos(2x1) denoted 14g, and cos(3x1) denoted 14h.

Each of these eight functional terms 14 is connected to an adaptive weighting block 16. The adaptive weighting block 16 comprises a weight element (1Ba and 1Bh) associated with each of the eight functional terms (14a to 14h) and a weight controller 20. Each weight element 18 is used to modify its associated functional term (14a to 14h), and thus produce a weighted functional term (22a to 22h) corresponding to each term. Each weight element 18 modifies its associated functional term 14 by multiplying the term 14 by a weight value received from the weight controller 20 to produce an individually weighted term 22. The weight controller 20 stores eight weight values, one value corresponding to each weight element 18. If a weight value is changed then the corresponding weight element 18 will apply a new weighting corresponding to the new weight value.

The individually weighted terms 22 are input to an adding block 24 which sums the individually weighted terms 22 to produce a summed term 26. This summed term 26 is then input to a comparator 28. The other input to the comparator 28 is a control input 30.

The comparator 28 produces a difference value 32 which is the difference between the summed term 26 and the control input 30. The difference value 32 is delivered to an analyser 34 which analyses the difference value 32, determines the new value of each weight element 18 which is required to reduce the difference value 32, and conveys the new value of each weight element 18 to the weight controller 20. The weight controller 20 then updates the weight value of each individual weight element 18 for use with the next input value x1.

The summed term 26 is connected to the data output 36, which represents the value in the mapping that is to be predicted.

Figure 3:
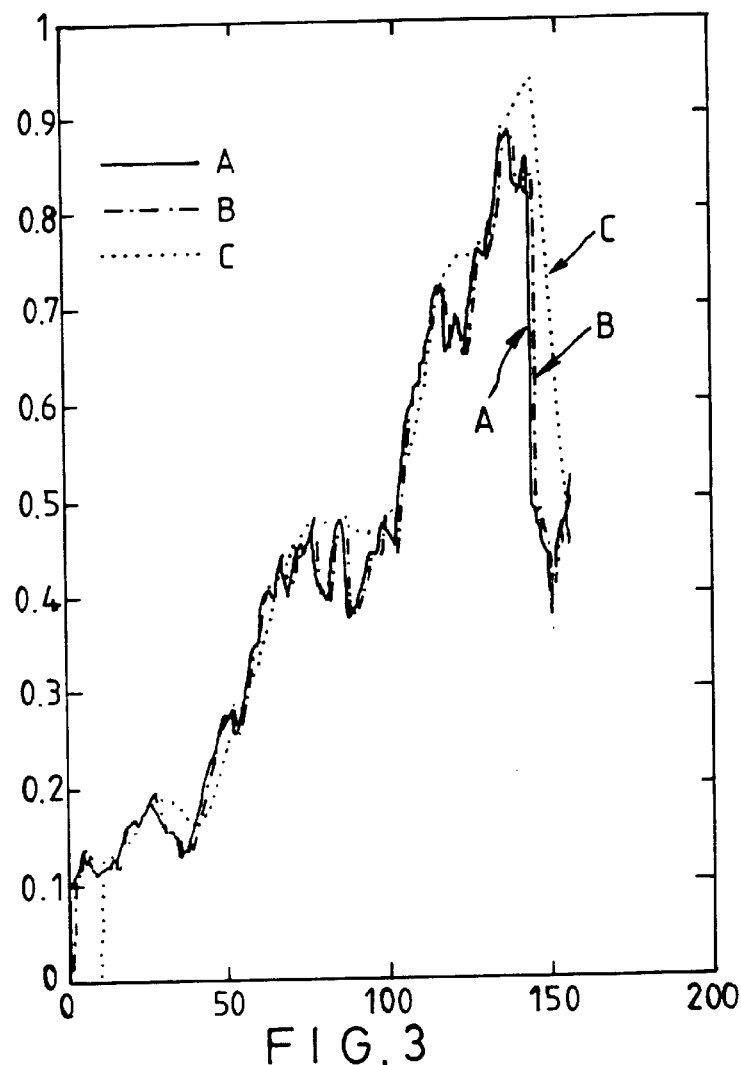
FIG. 3 is a graph of a non-linear mapping in the form of a real world non-linear time series with the one-step prediction results from two arrangements for predicting the next value in the series.

When the next term of a non-linear mapping, such as the one shown in FIG. 3, is to be predicted, only one input 10 is needed. The value of the last known term of the mapping, i.e. x1, is applied to the input 10.

For the purpose of setting up the system if no historic values of the mapping are already known the input 10 is set to zero. The weight values of weighting elements 18 may be set to zero or to any arbitrary values. The resulting summed term 26 is a one-step ahead prediction of the mapping value and is unlikely to be accurate because the initial value at input 10 and the weight values at 18 have not been set properly. Once the correct value of the mapping becomes known (the true value corresponding to the value which was was just predicted) it is used as the control input 30. The comparator 28 then compares the existing summed term 26 with the control input 30 to produce a difference value 32 which is assessed by the analyser 34 to generate new weight values. The control input 30 value is then applied to input 10 and the process is repeated. Subsequent repeats produce one-step ahead predictions which are likely to become increasingly more accurate because the value at input 10 and the weight values 18 have increasingly become more accurately set.

For the purpose of setting up the system when several historic values of the mapping are already known the input 10 is initially set to one of these values. The weight values of weighting elements 18 may be set to zero or to any arbitrary values. The resulting summed term is a one step ahead prediction. Since the predicted value is in fact already known the weight values can be updated iteratively until the one step-ahead prediction is sufficiently similar to the known predicted value. The procedure can then be continued through the remaining known historic values. If so desired the weight values can be updated only once for each predicted value and the process thereafter continued through the remaining known historic values.

Modifying the weight applied to the function(s) generated by a function generator using the difference between the predicted value and the true value is a technique well-known in the art. It is a technique which is used for general adaptive filter applications as well as for neural network structures. Both the RBF and MLP neural network structures use an error output to determine the correct value of the weights to be applied.

Although the FIG. 2 embodiment uses eight functional terms 14 with an individual weight element 18 applied to each, conventional techniques can be used to determine the correct value for each weight value. In this embodiment, a conventional exponentially weighted recursive least squares algorithm is used by analyser 34 to determine the optimum value of each weight value. This technique is described by Simon Haykin in "Adaptive Filter Theory", Prentice Hall Inc. Englewood Cliffs, N.J., USA, 1991.

The adaptive weighting block 16, adding block 24, comparator 28, control input 30, analyser 34, and data output 36 comprise an output layer 40 (sometimes referred to as a linear combiner).

Referring to FIG. 3, which shows a graph of a non-linear mapping in the form of a real world non-linear time series with the one-step prediction results from two arrangements for predicting the next value in the series. The actual series is shown as a solid line A, the predicted series resulting from the FIG. 2 embodiment of the present invention is shown as a chain dotted line B, and the predicted series resulting from a prior art linear ten input moving average model is shown as a dotted line C. FIG. 3 clearly shows that the predicted series B resulting from the FIG. 2 embodiment of the present invention is a closer match to the actual series A than the predicted series C resulting from the linear ten input moving average model.

Figure 4:
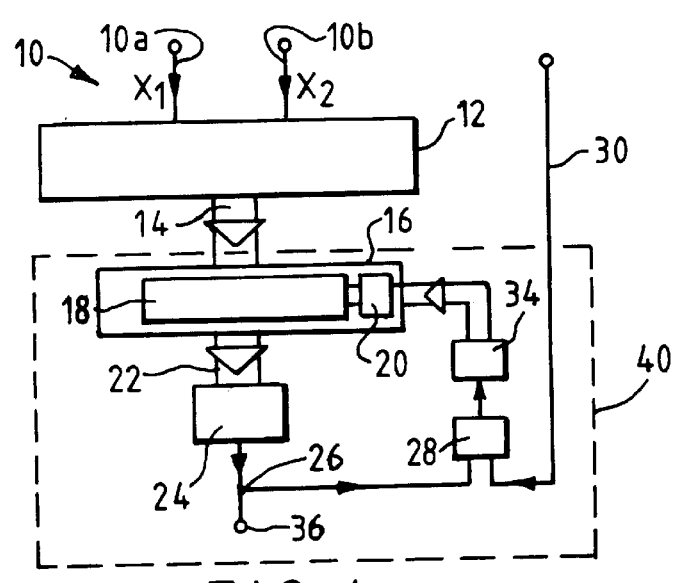
FIG. 4 is a second embodiment of the present invention, with two inputs and one output.

Referring to FIG. 4, which shows a second embodiment of the present invention, there are two mapping inputs 10 (the first input 10a is labelled x1 and the second input 10b is labelled x2) rather than the single mapping input of the first embodiment. Each mapping input 10 receives one value of a mapping function. Since there are two mapping inputs 10a, 10b and the single hidden layer function generator 12 operates on each mapping input 10 more functional terms can be produced in this embodiment than in the first embodiment. In this embodiment, twenty functional terms 14 are generated by the function generator.

The functional terms produced are: a zero-order (constant) value; two terms corresponding to the original inputs, term x1 and term x2, which enable linear systems to be modelled; three sine expansions of each input sin(x1), sin(2x1), sin(3x1), sin(x2), sin(2x2), sin(3x2); three cosine expansions of each input cos(x1), cos(2x1), cos(3x1), cos(x2), cos(2x2), cos(3x2); the product of each input with the sine and cosine of the other input x1sin(x2), x2sin(x1), x1 cos(x2), x2cos(x1 ); and the product of the inputs x1 x2.

The structure of the second embodiment is very similar to the structure of the first embodiment. The main differences in the structures of the two embodiments are the two mapping inputs 10a,10b instead of one mapping input, and twenty functional terms instead of eight functional terms. The principle of operation of the structure of the second embodiment is exactly the same as the principle of operation of the structure of the first embodiment and for this reason like components have been denoted with same numeric labelling as for FIG. 2.

Figure 5:
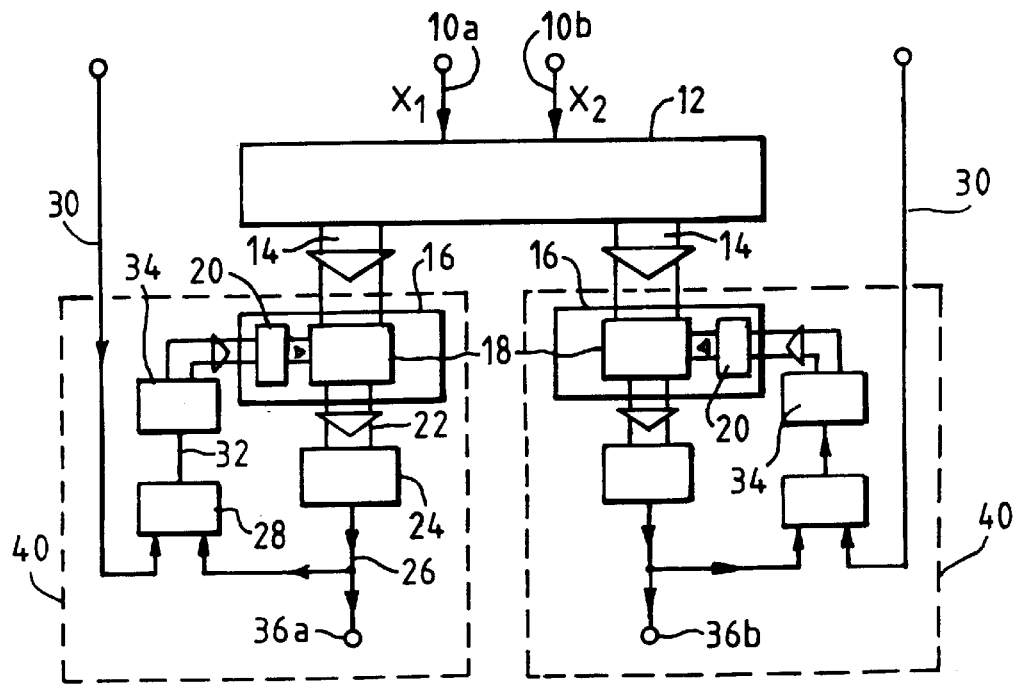
FIG. 5 is a third embodiment of the present invention, with two inputs and two outputs.

Referring to FIG. 5, which shows a third embodiment of the present invention, there are two data outputs 36a and 36b rather than the single data output 36 of the first and second embodiments. The mapping inputs 10a,10b and the function generator 12 are the same in the third embodiment as in the second embodiment. However, the twenty functional terms 14 generated by the function generator 12 are connected to two output layers 40.

In the second embodiment (depicted in FIG. 4) the twenty functional terms 14 are connected to a single output layer 40. One output layer 40 is needed for each output 36. Each output layer 40 in the third embodiment operates independently of the other output layer. The principle of operation of each output layer is the same, and was previously described for the first embodiment.

Figure 6:
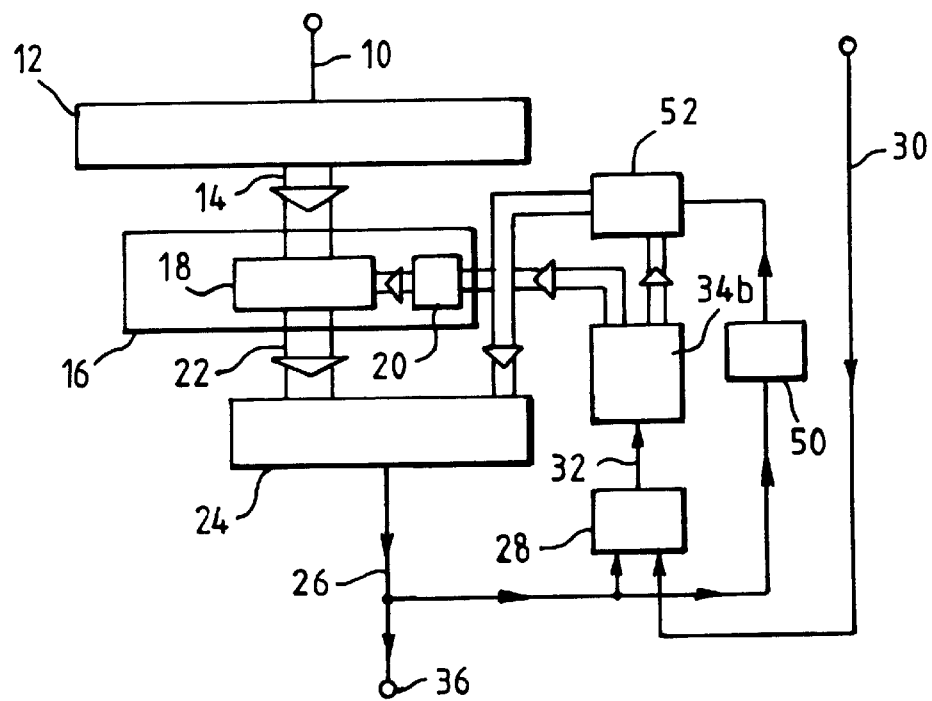
FIG. 6 is a fourth embodiment of the present invention, with one input, one output, and a feedback loop.

A fourth embodiment of the present invention is shown in FIG. 6. The structure of the fourth embodiment is similar to that of the first embodiment but with the addition of a feedback loop. In the fourth embodiment the summed term is connected to a delay block 50 in addition to being connected to the comparator 28. The output of the delay block 50 is also connected to a feedback adaptive weight block 52.

The feedback adaptive weighting block 52 performs the same function as the weighting block 16, but the feedback weighting block 52 operates on the delayed summed term 26. The feedback weighting block 52 is controlled by a modified analyser 34b, which performs exactly the same function as the analyser 34 but for both the feedback weighting block 52 and the weighting block 16. The modified analyser 34b determines the correct weight value to be applied to the delayed summed term 26 as well as the correct weight value to be applied to each of the functional terms 14. Both the feedback weighting block 52 and the weighting block 16 update the respective weight elements 18 accordingly. In other respects, the operation of the fourth embodiment is the same as the operation of the first embodiment of the present invention.

The above embodiments can be used for real time applications. However, as has been explained, at start up the first few predicted values for the application may be very different to the true values for the particular application because a few test values are needed before the weights can be properly adjusted.

If data from a non-linear mapping is known then the neural network structures of the above embodiments can be trained using the known data. As has ben explained, training involves applying one value of the mapping to the mapping input and the next value of the mapping to the control input. This is done successively until all of the known values of the mapping have been used or until the difference value is less than a predetermined value. When the trained structure is used in the application for which it was trained than all of the values predicted should be reasonably accurate.

In many applications not all of the functional terms are required: many of the terms have a negligible effect on the summed term. Thus, if a training period is used, the terms that have negligible effect may be pruned. Pruning is a process which is used to reduce the size of the overall structure. Once the structure has been set up as described above then insignificant weights are pruned from the structure (by setting the weight value permanently to zero). The new structure is then re-trained and tested. The pruning stage is accepted or rejected according to a statistical (Chi-squared) validation test.

The above embodiments can be used for loss-less transmission of information. If two neural network structures of the present invention are preset with the same functional terms and weights and operate according to a common reference, then the difference value can be transmitted and the next inputs can be derived from the difference value.

Figure 8A:
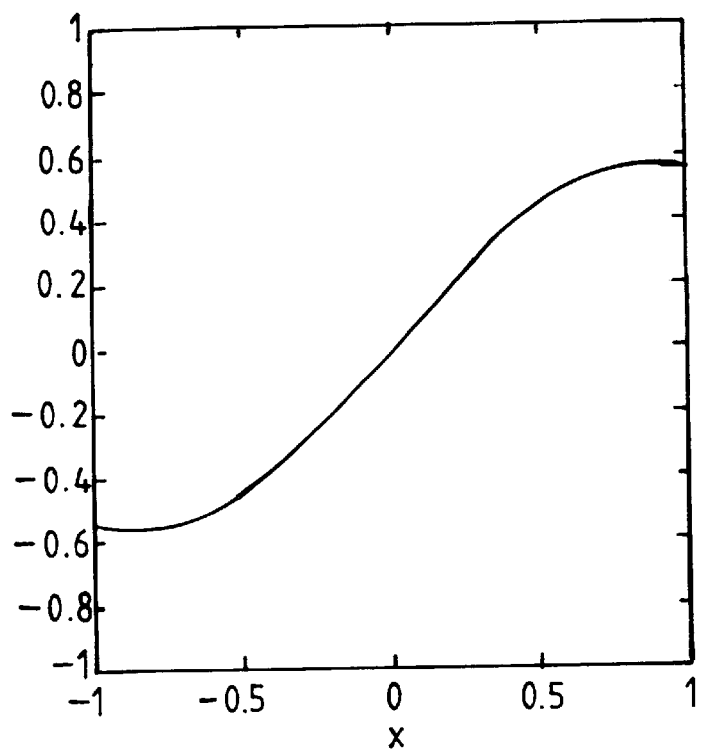
FIG. 8a is a graph of the functions produced by y=xsine(x) where x is the normalised input and y is the value displayed on the y-axis.
Figure 8B:
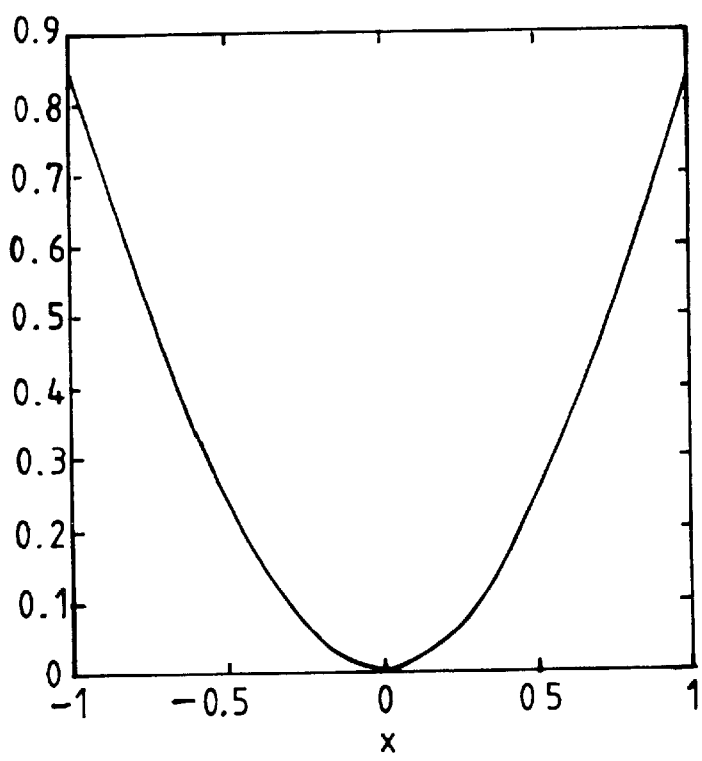
FIG. 8b) is a graph of the functions produced by y=xcosine(x) where x is the normalised input and y is the value displayed on the y-axis.

The reason that the present invention provides improved prediction of non-linear mappings compared with previous single hidden layer neural networks is because the trigonometric terms used simulate the effect of both Sigmoidal-shaped activation functions and Gaussian-shaped activation functions simultaneously. This can be seen from FIG. 7a which shows the sine terms which are similar to a Sigmoidal shape, and also FIG. 8a which shows the (x)sine(x) term which is also similar to a Sigmoidal shape. Similarly, FIG. 7b shows the cosine terms which are similar to a Gaussian shape, and FIG. 8b shows the (x)cosine(x) term which is similar to an inverted Gaussian shape.

It will be appreciated that various modifications may be made to the above described embodiments within the scope of the present invention. For example, in the first and fourth embodiments eight functional terms are used, and in the second and third embodiments twenty functional terms are used, however, it will be apparent that the number of terms used is not limited to a minimum of eight nor to a maximum of twenty, and it will also be apparent that the terms chosen are given by way of example, other suitable terms could be used, for example terms such as coseo(x1 ), cotan(x1 ), (x1 )cosec(x1 ), but not Gaussian or Sigmoidal terms.

In the above embodiments sine and cosine functions are used, however, this is not essential to the embodiments of the invention. The invention requires the use of at least one trigonometric term. It is generally understood that a trigonometric term is a term which relates the sides and angles of a triangle.

In the above embodiments an exponentially weighted recursive least squares algorithm is used in analyser 34 to determine the optimum weight value for each weight element 18, however, other conventional techniques such as a least mean squares technique may be used in analyser 34.

In the above embodiments the weight values may initially set to zero, however, any convenient value between plus one and minus one may be used.

In the above embodiments the iterative process when utilised is repeated a predetermined number of times. Alternatively, the iterative process when utilized may be repeated until the difference value is reduced to a certain value, or in real time applications, until the input changes.

It will be appreciated that an embodiment of the present invention could be implemented on the basis of the concept hereinbefore described to accomodate any number of inputs and any number of outputs: for example, an embodiment with twelve inputs and four outputs could be implemented.

What is claimed is:

1. A neural network for predicting values in non-linear functional mappings comprising:
   an input;
   an output;
   a single hidden layer function generator (12) connected to said input; and
   an output layer (40) connected between said single hidden layer function generator and said output,
      wherein said single hidden layer function generator (12) receives one or more mapping inputs (x1) and generates a plurality of terms (14) from each mapping input, said terms (14) including at least one trigonometric term selected from the group comprising sinx1, sin2x1, sin3x1, cosx1, cos2x1, cos3x1, cosecx1 , cotanx1, and being free of Gaussian and Sigmoidal terms.

2. A neural network as claimed in claim 1, wherein said single hidden layer function generator (12) generates at least two trigonometric terms from the group of trigonometric terms, one is a sine term and the other term is a cosine term.

3. A neural network as claimed in claim 1, wherein said single hidden layer function generator (12) has more than one input (x1 x2) and said terms include terms resulting from the product of at least two or more of the inputs (x1 x2).

4. A neural network as claimed in claim 1, wherein said single hidden layer function generator (12) selects at least one term from the group of terms consisting of: a zero order term, the original mapping inputs(s), sine functions of the mapping input(s) from the set sinx1 , sin2x1 , sin3x1 , sinx2, sin2x2, sin3x2, cosine functions of the mapping input(s) from the set cosx1 , cos2x1 , cos3x1, cosx2, cos2x2, cos3x2, functions equaling the product of a mapping input and a sine function of another mapping input, functions equaling the product of a mapping input and a cosine function of another mapping unit, functions equaling the product of a mapping input and a different mapping input.

5. A neural network as claimed in claim 1 including an adaptive weight block (18) comprising a plurality of weight elements (18a, 18b, etc.) and a weight controller (20), where each weight element receives one of said generated terms from said single hidden layer function generator (12) and multiplies the said generated term by a value received from said weight controller (20) to produce an individually weighted term (22); an adding block (24) for receiving each individually weighted term (22) and for adding the individually weighted terms to produce a summed term (26); a data output (36) representing the predicted term of the mapping which is connected to an output of the adding block (24) to receive the summed term (26); a comparator (28) for receiving the summed term (26) and a control input (30) and for comparing the summed term with the control input (30) to generate a difference value (32); an analyzer (34) for receiving the difference value, for determining a new value of each individual weight element (18a, 18b, etc.) needed to minimize the difference value (32), and for conveying the said new value of each individual weight to the weight controller (20), to enable the weight controller (20) to adjust the individual weight elements for use with a subsequent mapping input.

* * * * *

UNITED STATES PATENT AND TRADEMARK OFFICE
CERTIFICATE OF CORRECTION

PATENT NO. : 6,453,206 B1
DATED : September 17, 2002
INVENTOR(S) : Soraghan et al.

It is certified that error appears in the above-identified patent and that said Letters Patent is hereby corrected as shown below:

Title page,
Item [56], References Cited, OTHER PUBLICATIONS,
Line 17, "Training smethoden" should read -- Trainingsmethoden --;
Line 19, "Datenverabeitung" should read -- Datenverarbeitung --.

Column 8,
Line 42, "unit" should read -- input --.

Signed and Sealed this

Fourth Day of February, 2003

JAMES E. ROGAN
*Director of the United States Patent and Trademark Office*